No. 895,106.
PATENTED AUG. 4, 1908.
A. E. NEWTON.
CHANGE SPEED GEARING FOR ENGINE LATHES.
APPLICATION FILED NOV. 11, 1904.
3 SHEETS—SHEET 3.
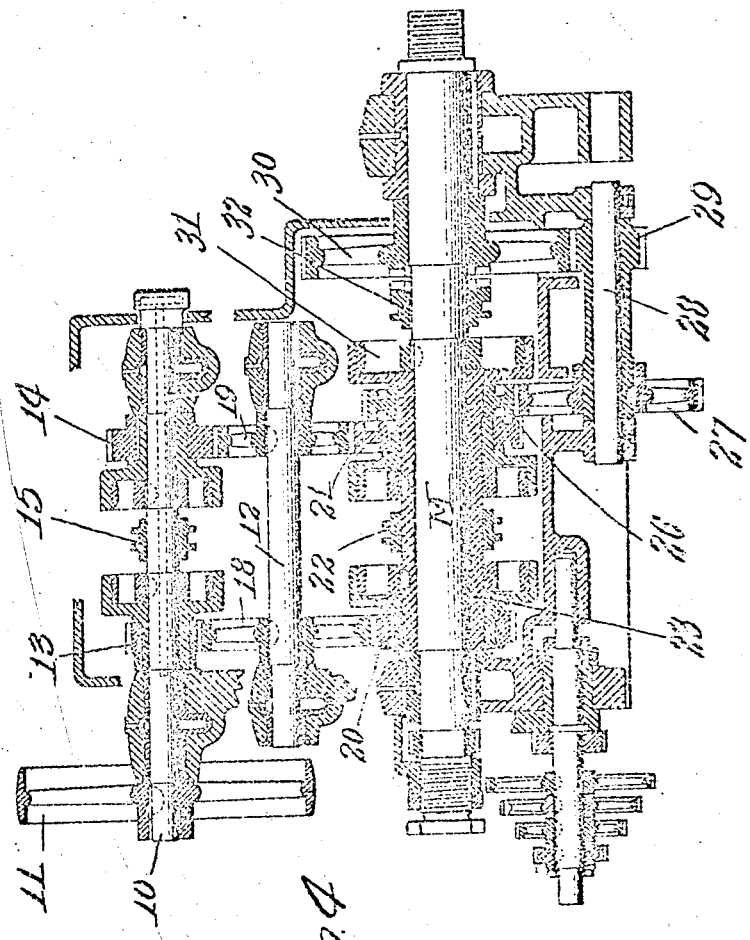

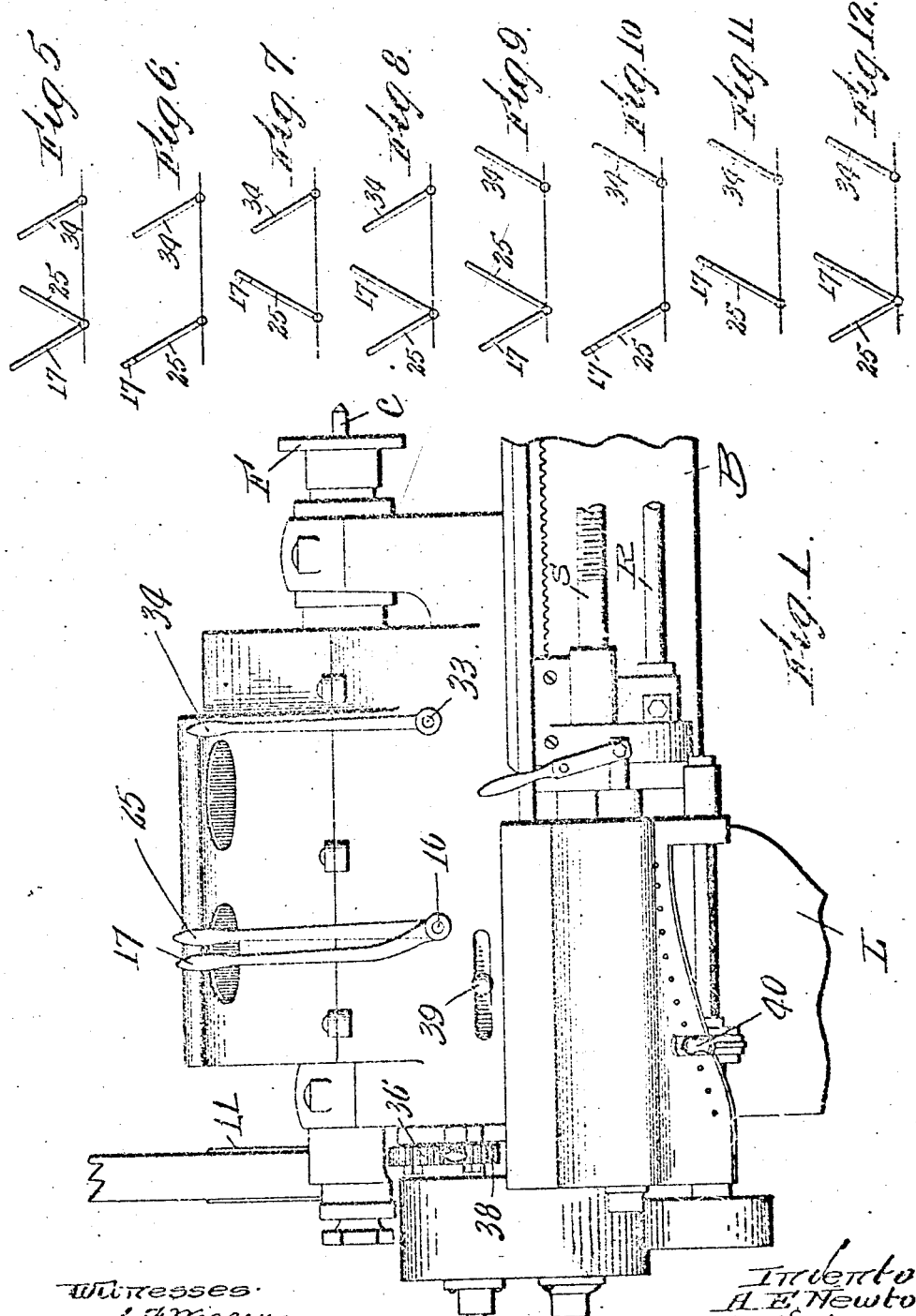

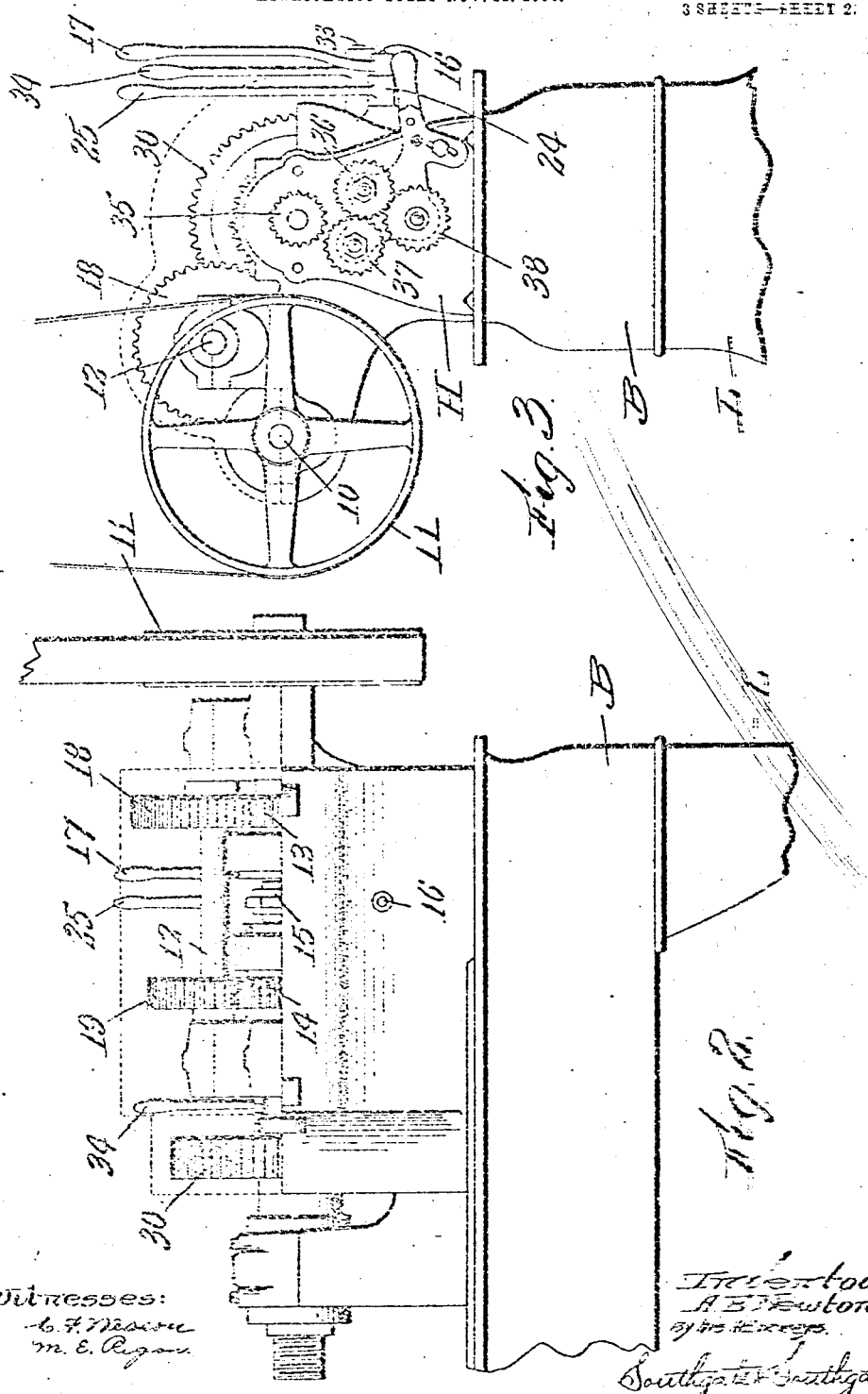

UNITED STATES PATENT OFFICE.

ALBERT E. NEWTON, OF WORCESTER, MASSACHUSETTS.

CHANGE-SPEED GEARING FOR ENGINE-LATHES.

No. 895,106.  Specification of Letters Patent.  Patented Aug. 4, 1908.

Application filed November 11, 1904. Serial No. 232,319.

*To all whom it may concern:*

Be it known that I, ALBERT E. NEWTON, a citizen of the United States, residing at Worcester, in the county of Worcester and State of Massachusetts, have invented a new and useful Change-Speed Gearing for Engine-Lathes, of which the following is a specification.

This invention relates particularly to change speed gearing for metal turning lathes.

The especial object of this invention is to provide an engine lathe in which the lathe spindle may be driven by means of strong, simple and efficient change speed gearing.

To these ends, this invention consists of the engine lathe and of the combinations of parts therein as hereinafter described and more particularly pointed out in the claims at the end of this specification.

In the accompanying three sheets of drawings, Figure 1 is a side view partly broken away of sufficient parts of a lathe head-stock to illustrate the application of this invention thereto. Fig. 2 is a rear view of the same. Fig. 3 is an end view thereof. Fig. 4 is a diagrammatic sectional plan view showing the trains of gearing for driving the head stock spindle, and Figs. 5 to 12 inclusive are diagrammatic views illustrating different relative positions of the controlling handles which produce different relative speeds.

In the use of the ordinary metal turning lathes the speed of rotation of the head stock spindle is varied by a shifting belt which runs on cone pulleys mounted respectively in the head-stock of the lathe and on the counter-shaft.

In addition to the use of cone pulleys the head-stock of an engine lathe is usually provided with back gears which are thrown into mesh when the head stock spindle is to be driven at still slower speeds than can be done directly from the cone pulley drive.

In the ordinary form of engine lathe, however, the primary speed change of the head stock spindle is secured by a cone pulley drive. In practice the use of a cone pulley drive for an engine lathe is objectionable for the reason that the driving belt is apt to have its greatest degree of slippage and will act in the least efficient manner at times when greatest power is required. For example, when the head stock spindle is to be driven at high speed, the driving belt is shifted to a cone pulley section of smallest diameter. At this time, although to drive the spindle at this high speed, the greatest amount of power will be required, yet, inasmuch as the driving belt runs on the section of smallest diameter of the cone pulley, it will have the least wrap or the least surface of engagement so that it will be the most liable to slippage of all positions to which it may be shifted.

The especial object of my present invention is to provide a reliable drive for the head stock spindle of an engine lathe which will eliminate the factor of slippage of the driving belt and which will secure different speeds of the head stock spindle by means of trains of spur gears, the driving belt of the lathe being always maintained upon a single driving pulley and not requiring shifting when the speed of the head stock spindle is changed.

In the special form of engine lathe which I have herein illustrated the head stock casting is provided with bearings for the head stock spindle for a primary driving shaft and for an intermediate shaft. Two trains of gears are employed between the primary driving shaft and a sleeve mounted upon the head stock spindle. By means of this construction four speed changes may be obtained for the sleeve on the head stock spindle.

The sleeve of the head stock spindle is provided with a clutch mechanism for making direct connection with the head stock spindle, and is also provided with a gearing for making connection with the head stock spindle through a front train of gears which secure the same effect as the ordinary back gears of a lathe, so that in the complete lathe eight changes of speed may be obtained to the head-stock spindle, these changes being controlled by a set of three levers.

Referring to the accompanying drawings for a detail description of a head stock spindle constructed according to this invention, as shown in Figs. 2 and 3, an engine lathe embodying this invention comprises the lathe bed or casting B, which may be supported on the legs L in the usual manner.

The lathe bed B is provided with the usual ways or guides, and fastened on the lathe bed B is the head stock casting H.

Journaled in the head stock casting H which serves as a support for the gearing and which is at the rear of the machine is a primary driving shaft 10 having a pulley 11 which receives the main driving belt. The pulley 11 runs at constant speed at all times during the operation of the lathe, and the change of speed of the head stock spindle is secured by shifting the connections through trains of intermediate gearing.

As shown most clearly in Fig. 4, the primary driving shaft 10 has loosely mounted thereon the sleeves which carry driving pinions 13 and 14, and inwardly facing friction clutch members which may be alternately engaged with the primary driving shaft by means of the operating-piece 15, which operating piece 15 may be moved back and forth by an ordinary fork which may extend up from a shaft 16, the shaft 16 as shown most clearly in Fig. 3, being provided with a shifting handle 17.

Meshing with and driven from the gears 13 and 14 are gears 18 and 19 which are secured upon the intermediate shaft 12, which intermediate shaft 12 is journaled in bearings in the head stock casting.

Meshing with and driven from the gears 18 and 19 of the intermediate shaft 12 are gears 20 and 21 which are carried by clutch pieces loosely mounted upon the sleeve 23 of the shaft M to be driven which in the present instance is the head stock spindle of a metal turning lathe.

Mounted between the clutch pieces which carry the gears 20 and 21 is an operating piece 22 which may be operated from the usual fork extending up from a sleeve 24 shown in Fig. 3, which sleeve 24 carries the handle 25.

Near its forward end the sleeve 23 is provided with a gear 26 which meshes with and drives a gear 27 upon the slowing down shaft 28, which slowing down shaft 28 is provided at its other end with a pinion 29 which meshes with and drives a large gear 30 upon the driven shaft or head stock spindle M.

The sleeve 23 is provided at its extreme forward end with a friction clutch 31, and the gear 30 is provided on its inner face with clutch teeth.

Coöperating with the friction clutch 31 and the clutch teeth of the gear 30 is an operating piece 32 which may be operated from a fork extending up from the shaft 33, which shaft 33 is provided with a controlling handle 34.

By means of this construction it will be seen that there are two trains of gearing between the primary driving shaft and the sleeve on the head stock spindle, which trains of gearing are provided with controlling levers so that by setting said controlling levers to different positions four speed changes for the speed of the head-stock spindle may be secured; while by the use of a third controlling lever a direct connection can be secured between the head stock spindle and its sleeve, or a connection may be secured which will correspond to the effect of the ordinary back gears of an engine lathe, thus making eight as the total number of speed changes of an engine lathe constructed according to this embodiment of the invention.

The position of the controlling handles to secure these eight speed changes are illustrated in Figs. 5 to 12 inclusive; the position of the controlling handles in Fig. 5 illustrating the adjustment to secure the highest speed of the head stock spindle; and Figs. 6 to 12 inclusive illustrating successive adjustments to secure successively slower speeds for the head stock spindle.

At its end the driven shaft or head stock spindle M may be provided with the usual face plate F and center C, and at its other end the head stock spindle may be provided with a gear 35 which either through a single intermediate 36 or two intermediates 36 and 37 may be connected to drive a gear 38 which forms part of the feed train of the lathe.

From the shaft of the gear 38 connections may be made to drive either the feed-rod R and lead-screw S of the lathe, said connections preferably comprising primary and secondary speed changing trains which may be controlled by the handles 39 and 40 respectively.

It is to be understood, however, that in this application for patent I do not wish to claim any particular change gearing connections between the head stock spindle and the lead-screw or feed-rod of the lathe, although in the drawings I have shown in part the arrangement of change speed gearing which is covered in an application for patent filed by me August 19, 1904, Serial No. 221,330.

I am aware that numerous changes may be made by skilled mechanics in practicing my invention without departing from the scope thereof as expressed in the claims, and I do not wish, therefore, to be limited to the particular construction I have herein shown and described, nor to the use of my invention in connection with any particular speed changing connections for the lead-screw or feed-rod, but What I do claim and desire to secure by Letters Patent of the United States is:—

1. In a speed changing device, a driving shaft, an intermediate shaft, variable speed gearing for driving the intermediate shaft from the driving shaft, a spindle shaft, a sleeve loosely mounted thereon, operative connections between the sleeve and spindle shaft, and a plurality of gears of different diameters on the sleeve, disposed between the sleeve and intermediate shaft and connected with the intermediate shaft to be driven thereby.

2. In a speed changing device, a driving shaft, an intermediate shaft, variable speed connections for driving the intermediate shaft from the driving shaft, a spindle shaft, a sleeve loosely mounted thereon, variable speed connections between the spindle shaft and sleeve, and variable speed connections including a plurality of gears of different diameters on the sleeve and disposed between the sleeve and intermediate shaft.

3. In a speed changing device, a driving shaft, a plurality of gears loosely mounted thereon and adapted for selective operative engagement with said shaft, an intermediate shaft, gears fixed thereon and in constant engagement with the said gears on the driving shaft, a spindle shaft, a sleeve loosely mounted thereon, means for operatively connecting the sleeve and spindle shaft, and variable speed gearing including a plurality of gears of different diameters on the sleeve and disposed between the sleeve and intermediate shaft and connected with the intermediate shaft.

4. In a speed changing device, a driving shaft, a plurality of gears of different diameters loosely mounted thereon, an intermediate shaft, a plurality of gears of different diameters fixed thereon and in constant engagement with the gears on the driving shaft, means for selectively connecting the gears on the driving shaft operatively therewith, a spindle shaft, a sleeve thereon, driving connections between the spindle shaft and sleeve and variable speed gearing between the sleeve and intermediate shaft including a plurality of gears of different diameters on the sleeve meshing with the gears on the intermediate shaft.

5. In a speed changing device, a driving shaft, two gears of different diameters loosely mounted thereon, a clutch for selectively connecting either of said gears operatively with the driving shaft, an intermediate shaft, two gears of different diameters fixed thereon and in constant engagement with said gears on the driving shaft, a spindle shaft, a sleeve loosely mounted thereon, operative connections between the sleeve and spindle shaft, and variable speed gearing including a plurality of gears of different diameters on the sleeve and between the sleeve and intermediate shaft and adapted to receive power from the intermediate shaft.

6. In a change-speed gearing, the combination of a shaft to be driven, a driving shaft, a sleeve concentric with the driven shaft, two trains of driving gears between the primary driving shaft and the sleeve, means for connecting the trains to secure four speed changes of the sleeve, and means for securing a direct connection between the sleeve and the driven shaft.

7. In a change-speed gearing, the combination of a support, a driven shaft journaled therein, a primary driving shaft and an intermediate shaft also journaled in the support, two sets of gears and two clutches for connecting the primary driving shaft to the intermediate shaft, a sleeve on the driven shaft, two gears and two clutches for connecting the intermediate shaft gears to the sleeve, a train of gears corresponding to the back gears of an ordinary lathe and means for directly connecting the sleeve to the driven shaft or for connecting the same to said train of gears.

8. In a change-speed gearing, the combination of a driven-shaft, a loose gear thereon, a primary driving shaft, an intermediate shaft, a sleeve on the driven shaft, two sets of gears and two clutches connecting the primary driving shaft with the intermediate shaft, a single operating piece for setting both of said clutches, two gears and two clutches connecting the intermediate shaft gears with the sleeve, a single operating piece for setting both of the last named clutches, a back-gear drive comprising a parallel shaft and gear connection between the sleeve and the loose gear upon the driven shaft, a friction clutch between the sleeve and the driven shaft, and a single operating piece for making a positive clutch connection between the loose gear and driven shaft, and for setting the friction clutch to directly connect the sleeve and the driven shaft.

9. In a change-speed gearing, the combination of a driven shaft, a sleeve thereon, a primary driving shaft, an intermediate shaft, two sets of gears and two clutches connecting the primary shaft with the intermediate shaft, a single operating piece for setting both of said clutches, two gears and two clutches connecting the intermediate shaft gears and the sleeve, a single operating piece for the last two named clutches, a train of back gearing, a friction clutch for making direct connection between the sleeve and the driven shaft, a single operating piece for the friction clutch and for making a positive clutch connection with the train of back gearing, and three independent levers for manipulating the said three operating pieces.

10. In a change speed gearing, the combination of two shafts, a shaft intermediate thereof, a series of gear wheels mounted on the intermediate shaft adapted to rotate in unison and prevented from longitudinal movement thereon, one of the first named shafts being geared to said gears, a sleeve on the other of said first named shafts, gears on said sleeve arranged to mesh with the gear wheels on the intermediate shaft and means for connecting the sleeve to rotate with, and disconnecting it from, the shaft on which it is mounted.

11. In a change speed gearing, the combination of a driving shaft, a driven shaft, an intermediate shaft, gears on said intermediate shaft adapted to rotate in unison and prevented from longitudinal movement, a sleeve on the driven shaft, a series of gears on said sleeve arranged to mesh with the gears on the intermediate shaft, a series of gears connected with the driving shaft arranged to mesh with the gears on said intermediate shaft, and means for changing the connections of said two series of gears so as to change the speed of the driven shaft.

In testimony whereof I have hereunto set my hand, in the presence of two subscribing witnesses.

ALBERT E. NEWTON

Witnesses:
PHILIP W. SOUTHGATE,
LOUIS W. SOUTHGATE.